(12) United States Patent
Noy et al.

(10) Patent No.: US 11,181,859 B2
(45) Date of Patent: Nov. 23, 2021

(54) CALIBRATING OPTICAL DENSITY

(71) Applicant: Hewlett-Packard Development Company, L.P., Spring, TX (US)

(72) Inventors: Gilad Noy, Nes Ziona (IL); Noam Parvin, Nes Ziona (IL); Vered Maagan, Nes Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/965,680

(22) PCT Filed: Mar. 30, 2018

(86) PCT No.: PCT/US2018/025341
§ 371 (c)(1),
(2) Date: Jul. 29, 2020

(87) PCT Pub. No.: WO2019/190546
PCT Pub. Date: Oct. 3, 2019

(65) Prior Publication Data
US 2021/0003449 A1   Jan. 7, 2021

(51) Int. Cl.
*G03G 15/00* (2006.01)
*G01N 21/59* (2006.01)
(Continued)

(52) U.S. Cl.
CPC ..... *G03G 15/5062* (2013.01); *G01N 21/5907* (2013.01); *H04N 1/00034* (2013.01); *H04N 1/00087* (2013.01); *B41J 2029/3935* (2013.01); *G01N 2021/5915* (2013.01); *G03G 2215/00042* (2013.01)

(58) Field of Classification Search
CPC .......... G03G 15/5062; G03G 15/6585; G03G 15/105; G03G 2215/00042; G01N 21/5907; G01N 2021/5915; H04N 1/00034; H04N 1/00087; B41J 2029/3935
See application file for complete search history.

(56) References Cited

U.S. PATENT DOCUMENTS 6,351,308 B1   2/2002   Mestha
7,734,204 B2   6/2010   Rowe
(Continued)

FOREIGN PATENT DOCUMENTS

CN   105073434 B   12/2017
JP   2001232925   8/2001

*Primary Examiner* — Carla J Therrien
(74) *Attorney, Agent, or Firm* — Michael A Dryja

(57) ABSTRACT

Method and devices for calibrating optical density reflective color fluids to be deposited on substrate are disclosed. Some methods comprise depositing a quantity of a keying color fluid on a first region of the substrate; applying a voltage level to a reflective color fluid application device; depositing, in response to the voltage level applied, a quantity of reflective color fluid on the first region of the substrate and on a second region of the substrate; performing reflectance measurements of the first region and of the second region; performing optical density calculations as a function of the reflectance measurements; varying the voltage level applied to the reflective color fluid application device in response to said optical density calculation until the optical density calculation is within a calibrated range of optical densities.

16 Claims, 3 Drawing Sheets

(51) Int. Cl.
*H04N 1/00* (2006.01)
*B41J 29/393* (2006.01)

(56) References Cited

U.S. PATENT DOCUMENTS

| | | | |
|---|---|---|---|
| 7,937,008 B2 | 5/2011 | Fujishima et al. | |
| 9,535,359 B2 | 1/2017 | Sandler et al. | |
| 2010/0201726 A1* | 8/2010 | Kondo | B41J 2/04593 347/10 |
| 2012/0033263 A1* | 2/2012 | Rich | H04N 1/405 358/3.06 |
| 2013/0164004 A1* | 6/2013 | Ai | G03G 15/0189 399/40 |
| 2016/0347051 A1* | 12/2016 | Narumi | B41J 2/2142 |

* cited by examiner

CALIBRATING OPTICAL DENSITY

BACKGROUND

Digital printing devices may form images on a print target by selectively charging or discharging a photoconductive member, such as a photoconductive drum, a photoconductive belt or other photoconductor units, based on an image to be printed. The selective charging or discharging may form a latent electrostatic image on the photoconductor. Colorants, or other printing fluids, may be developed onto the latent image of the photoconductor, and the colorant or printing liquid may be transferred to the print media to form the image on the media. In some liquid EP (LEP) printing devices, printing liquid may be used as the colorant instead of toner. In some LEP devices, printing liquid may be developed in a developer unit and then selectively transferred to the photoconductor (a "zero transfer"). For example, the printing liquid may have a charge that causes it to be electrostatically attracted to the latent image on the photoconductor. The photoconductor may transfer the printing liquid to an intermediate transfer member (ITM), which may include a transfer blanket, (a "first transfer"), where it may be heated until a liquid carrier evaporates, or substantially evaporates, and resinous colorants melt. The ITM may transfer the resinous colorants to the surface of the print media (a "second transfer"), which may be supported on a rotating impression member (e.g., a rotating impression drum).

BRIEF DESCRIPTION OF THE DRAWINGS

Various example features will be apparent from the detailed description which follows, taken in conjunction with the accompanying drawings, wherein.

DETAILED DESCRIPTION

This disclosure relates to calibrating optical density of a reflective color printing liquid in a printing system. Some LEP devices comprise multiple developer units. Some multiple developer unit LEP devices comprise a developer unit for a luminance or contrast adjusting color print fluid. For example, in four-color printing, cyan, magenta, and yellow color printing plates are used. Such color printing plates are aligned or keyed, with the key of the black plate. The luminance or contrast adjusting color print fluid is sometimes called a keying color print fluid. The keying color print fluid in most LEP devices is a black print fluid. At times, developer units may be desired for "reflective" color print fluids that may form images having a metallic aspect, such as appearing to comprise a metal, such as resembling silver or gold, by way of non-limiting example, on a substrate. In one case, for example, a silver color print fluid may comprise flakes of aluminum (Al) as part of the solids contained in the print fluid. The silver color fluid may further comprise resin and an isoparaffin fluid, e.g. Isopar L. The fluid may be in the form of an ink that contains a mixture of solid ink particles and liquids. What is eventually left on the substrate is mostly solid ink particles.

The optical density of the reflective color print fluid is controlled by a voltage controller of the reflective color developer unit. A higher voltage (also called "electrode voltage") may result in a thicker material (e.g. ink) layer on the substrate that may result in a higher optical density.

The optical density of print fluids is at times calibrated using a spectrophotometer. At times a spectrophotometer includes a sensor, a light source, a polarized filter following the light source and another polarized filter prior to the sensor. In such times the sensor output is responding monotonically to the change of electrode voltage applied to the reflective color developer unit, which is an indication that changes in electrode voltage are correlated with reflective color layer increases, i.e. higher optical density, on the print media. Thus by adjusting the electrode voltage, optical density of the reflective color fluid may be accurately calibrated. However, at other times, the spectrophotometer may not include the polarized filters (also called "polarizers"). In such cases, the optical density may not be accurately calibrated as the sensor may not be sensitive enough and may saturate in a desired work range. The absence of polarized filters does not allow a correlation between the spectrophotometer measurements of the reflective color on the print media and the electrode voltage values applied to the reflective color developer unit. It is thus not possible to set or adjust the quantity of reflective fluid by using the spectrophotometer measurements of the reflective color layers deposited on the print media.

Figure 1:
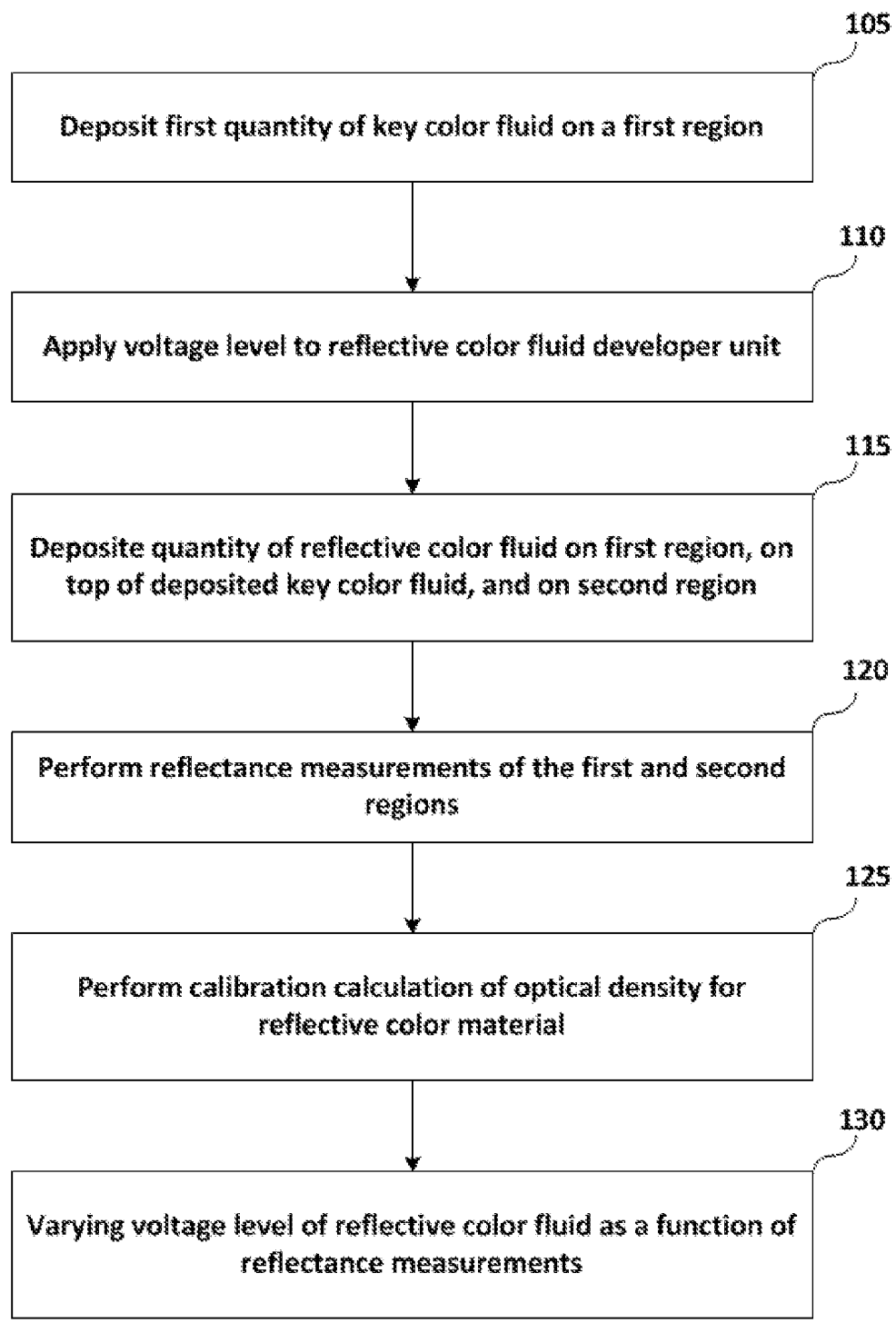
FIG. 1 is a flow diagram of a method of calibrating optical density of a reflective color fluid to be deposited on a substrate, according to an example.
Figure 2B:
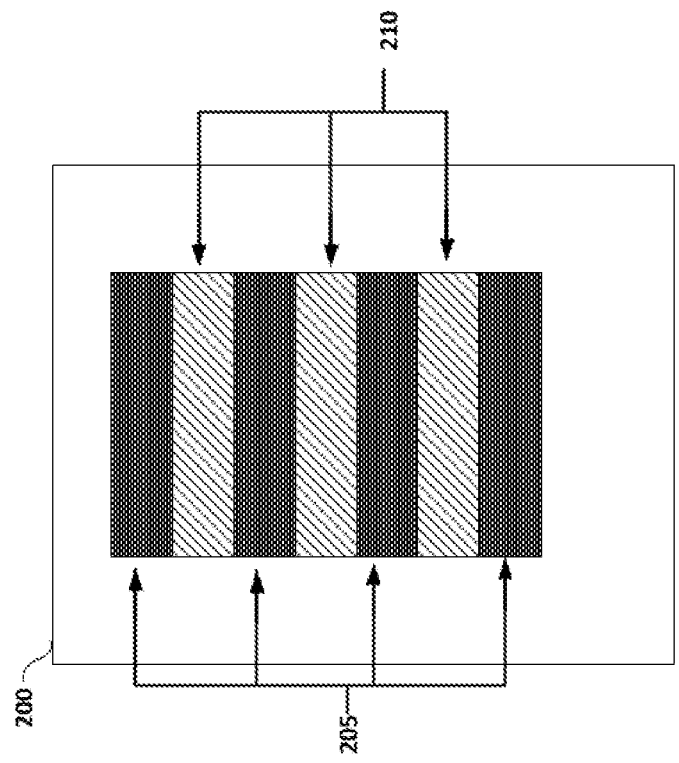
FIG. 2B schematically illustrates first and second regions of a print media printed for an optical density calibration process.
Figure 2A:
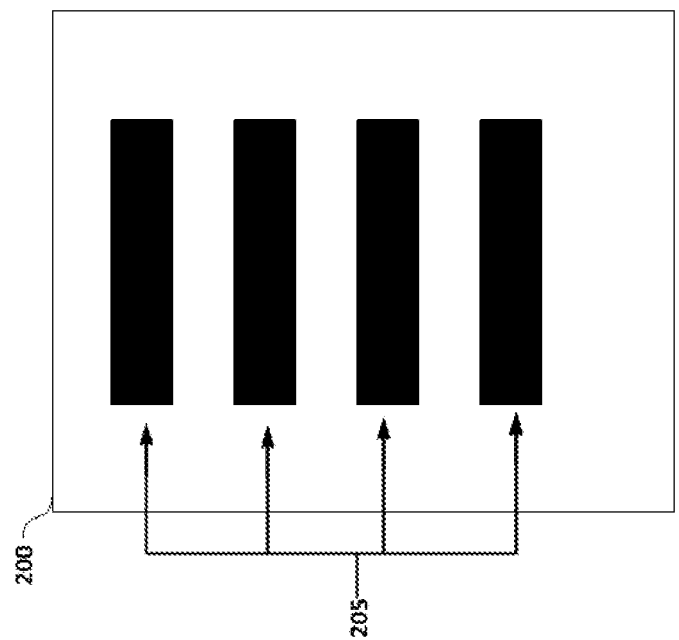
FIG. 2A schematically illustrates a first region of a print media printed for an optical density calibration process.

FIG. 1 is a flow diagram of a method of calibrating optical density of a reflective color fluid to be deposited on a substrate, according to an example. In block 105, a quantity of a keying color fluid may be deposited on a first region of the substrate. A CMYK scheme is a scheme for combining primary pigments. The letter C stands for cyan color, the letter M stands for magenta color, the letter Y for yellow color and the letter K for "keying" color. The keying color in most fluid deposition devices or printing systems is provided using a black color fluid. The first region printed with the keying color fluid may comprise lines or stripes. The solid ink particles will form the lines or stripes on the substrate. FIG. 2A schematically illustrates the first region. Each of the lines or stripes 205 comprises part of the first region. Depositing a quantity of keying color fluid may comprise applying a voltage level to a keying color fluid application device. The quantity of keying color fluid corresponding to the applied voltage level.

In block 110, a voltage level is applied to a reflective color fluid application device. The voltage level applied may correspond to a quantity of reflective color fluid to be transferred to a predetermined area of the substrate. Said in another way, the voltage level applied to the reflective color fluid application device corresponds to the amount of fluid transferred on the substrate. In turn, the amount of fluid transferred corresponds to the optical density of the material transferred on the substrate. The reflective color fluid application device may contain reflective color fluid to be transferred on the substrate.

In block 115, in response to the voltage level applied, a quantity of reflective color fluid may be deposited on the first region of the substrate, on top of the deposited keying color fluid, and on a second region of the substrate. FIG. 2B schematically illustrates the first and second regions printed for the optical density calibration process. The second region may be formed of lines or stripes 210 interposed between the lines or stripes of the first region. However, other any other area configuration may be possible. Reflective color fluids may form films with specular reflection on the printing substrate. The regions printed with reflective color fluid may have a higher reflectivity than the regions printed with keying color fluid. In some cases, the reflective color fluid may be a silver color fluid or silver-like color fluid. In some cases, the quantity of reflective color fluid may be transferred on the substrate, on the first and second region, in multiple deposition passes. For example, one part of the quantity may be transferred, deposited or printed during a first deposition pass whereas another part in a second deposition pass or during subsequent deposition passes.

In case the substrate is transparent, then a white color fluid may be deposited on the substrate on the first and second regions before the keying color fluid and the reflective color fluid are deposited. The white color material on the substrate allows for the substrate to reflect any incident light (e.g from a spectrophotometer).

In block 120, reflectance measurements of the first region and of the second region may be performed. After the keying color fluid and the reflective color fluid have been transferred on the substrate, the reflectance of the different regions on the printed area may be measured using a spectrophotometer with no polarizers. As the color of the different areas is different, different reflectance measurements are to be acquired.

In block 125, a calibration optical density calculation may be performed as a function of the reflectance measurements. The reflectance measurements may correspond to optical density values. By using the corresponding optical density values for the reflectance measurements of the first and second regions, it is possible to calculate a calibration optical density value as a function of derived optical density values from the reflectance measurements of the first and second regions. For example, the calibration optical density calculation may comprise the function of subtracting the optical density of the second region from the optical density of the first region. That is:

$$COD = RKOD - ROD \qquad (Eq.\ 1)$$

Where COD is the calibration optical density value, RKOD is the optical density value of the first region (printed with reflective color fluid on top of the keying color fluid and measured with a spectrophotometer having no polarizers) and ROD is the optical density value of the second region (printed with reflective color fluid and also measured with a spectrophotometer having no polarizers). There is a reverse correlation between COD measured with a spectrophotometer with no polarizers and ROD measured with polarizers. That is, a decrease in COD indicates an increase in ROD if the ROD was measured with a spectrophotometer with polarizers and corresponding increase in the quantity of reflective color fluid printed per square area. Thus, using Eq. 1 with measurements acquired from a spectrophotometer with no polarizers allows for an optical density calculation analogous to the one provided by a spectrophotometer with polarizers. It is thus possible to correlate the electrode voltage applied to the reflective color developer unit with a calibration optical density value derived from spectrophotometer measurements of areas printed with reflective color layers on the print media and of areas printed with reflective color layers on top of keying color (e.g. black color) layers on the print media. The proposed calibration method allows for accurate calibration of optical density in printing systems having spectrophotometers without polarizers with an accuracy comparable to printing systems having spectrophotometers with polarizers.

In a further example, the reflective color fluid may be deposited twice on the substrate, that is, one part of the quantity of reflective color fluid may be transferred during a first pass whereas the other part of reflective color fluid may be transferred during a second pass. This may provide more reflectance to the first and second regions to make the reflectance measurements more robust.

In block 130, the voltage level applied to the reflective color fluid application device may be varied in response to said calibration optical density calculation until the optical density calculation is within a calibrated range of optical densities. The calibration optical density calculation may provide a value that may correspond to an optical density value that may fall outside a range of optical density values that may be desired for a particular printer or for a particular application. By varying the voltage level of the reflective color fluid application device and by repeating the calibration process, a different optical density may be achieved. Thus by changing (increasing or decreasing) the voltage level applied to the reflective color fluid application device and by repeating the reflectance measurements and calculations for the new voltage levels an optical density within a desired range of optical densities may be provided. In some examples, a mathematical function may be identified associating voltage level and corresponding optical density. After a number of OD calibration processes the slope of the mathematical function may be updated. Thus, when a further OD calibration process is performed, the updated slope may be used to identify the voltage level that may provide the desired OD. If no mathematical function is present, various iterations may be performed until the desired OD is reached, however the identification of a mathematical function and subsequent use of its slope may reduce the number of iterations over time.

Figure 3:
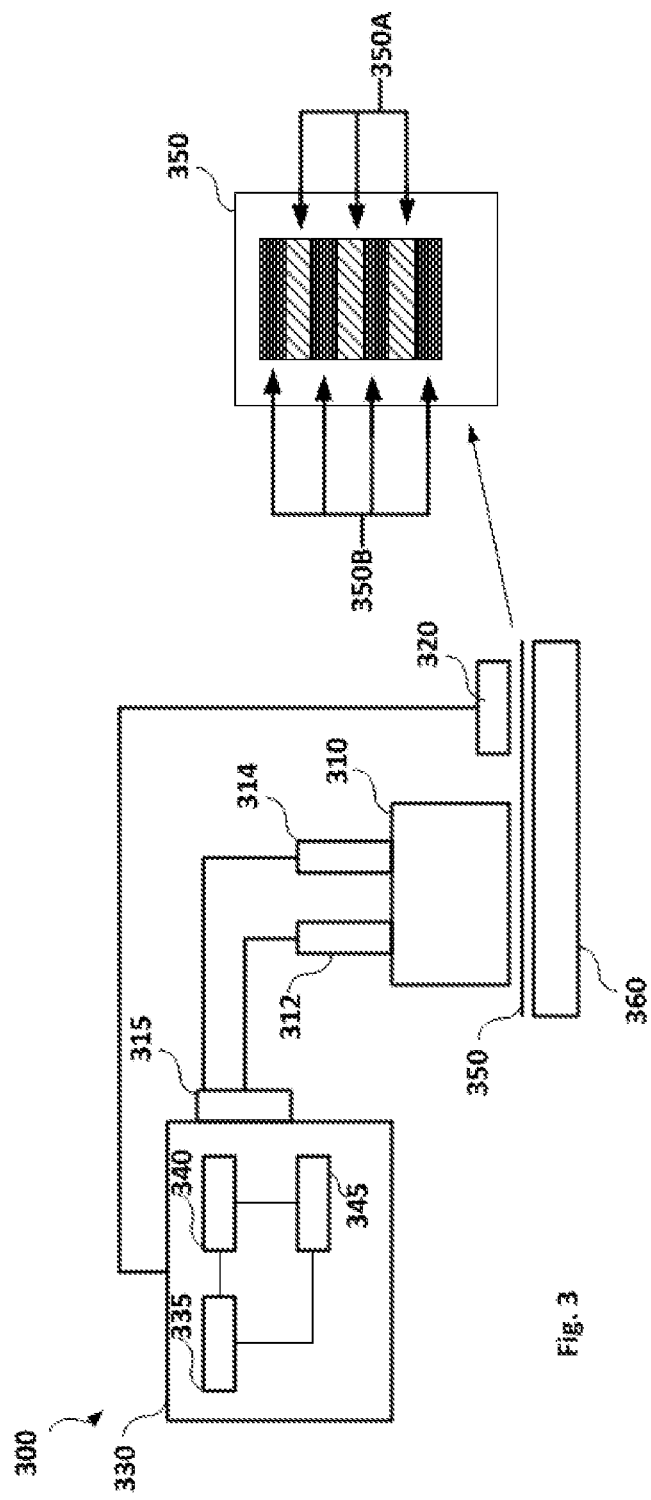
FIG. 3 is a block diagram of an example printing system according to the present disclosure.

FIG. 3 is a block diagram of an example printing system according to the present disclosure. The printing system 300 may comprise a printer 310, a spectrophotometer 320 and a controller 330. Printer 310 may for example be a thermal ink jet printer, piezo ink jet printer, laser printer or LEP printer (LEP). The controller may comprise a processor 335, a data storage 340 coupled to the processor and an instruction set 345. The instruction set 345 may cooperate with the processor 335 and the data storage 340 to print first and second areas on a print media 350. In FIG. 3, print media 350, e.g. a paper, is illustrated in a lateral view and in a top view. In the top view it is shown the printed print media 350 where the first printed areas 350A may comprise reflective color material and that the second printed areas 350B may comprise the reflective color material on top of a keying color material. The spectrophotometer 320 may scan the printed areas and measure optical density of the first and second printed areas and provide the measurements to the controller 330. The controller 330 may calculate a difference between the received optical density measurement values of the first and second printed areas. The controller 330 may compare the calculated difference with optical density range values stored in the data storage 340. If the calculated difference falls within the optical density range values stored in the data storage, then the calibration may be considered completed. Otherwise, the controller 340 may vary the amount of the reflective color fluid to be printed on the print media per square unit (e.g. per square cm) in response to the calculated difference. A new calibration process may then take place using clean (unused) areas of the print media or a new print media.

In some examples, the printer 310 may comprise fluid application devices. The term "fluid application device" refers to a device that applies fluid to a surface or a print media. The printer 310 may comprise, among others, a reflective color fluid application device 312 and a keying color fluid application device 314. In one example, the reflective color fluid application device may be a silver color fluid application device 312 and the keying color fluid application device may be a black color fluid application device 314. The printer 310 may comprise a voltage controller 315 coupled to the reflective (e.g. silver) color fluid application device 312 and to the keying (e.g. black) color fluid application device 314. The voltage controller 315 may form part of the printing system controller 330 or may be a separate controller. Furthermore, in some cases, each fluid application device may have its own voltage controller or a single voltage controller may control voltage of the various fluid application devices. In case the voltage controller 315 is different from the controller 340, the controller 340 may provide instructions to the voltage controller 315 to vary the voltage level of the reflective (e.g. silver) color fluid application device 312 in response to the measurements received from the spectrophotometer 320 and subsequent calculations.

In an example, controller 333 is an electronic controller which communicates with the printer and the spectrophotometer. In an example, the controller is an electronic controller which comprises a processor 335 and a memory or data storage 340 and possibly other electronic circuits for communication including receiving and sending electronic input and output signals. An example electronic controller may receive data from a host system, such as a computer, and may include memory for temporarily storing data. Data may be sent to an electronic controller along an electronic, infrared, optical or other information transfer path. The processor 335 may perform operations on data. In an example, the processor is an application specific processor, for example a processor dedicated to printer calibration, or to printing. The processor may also be a central processing unit. In an example, the processor comprises an electronic logic circuit or core and a plurality of input and output pins for transmitting and receiving data. The controller 330 comprises data storage 340. Data storage may include any electronic, magnetic, optical, or other physical storage device that stores executable instructions. Data storage 340 may be, for example, Random Access Memory (RAM), an Electrically-Erasable Programmable Read-Only Memory (EEPROM), a storage drive, an optical disk, and the like. Data storage 340 is coupled to the processor 335.

The controller 330 comprises an instruction set 345. Instruction set 345 cooperates with the processor 335 and the data storage 340. In the example, instruction set 345 comprises executable instructions for the processor 335, the executable instructions being encoded in data storage 340. Instruction set 345 cooperates with the processor 335 and data storage 340 to print a calibration image with the printer 310 on a printing media 350 to produce a calibration document. The reflectance or optical density of the printed areas of the calibration document may then be measured with the spectrophotometer 320. Based on the measured values, the controller may calculate a new voltage level to perform calibration of the optical density.

In an example, instruction set 345 is to cooperate with the processor 335 and the data storage 340 to calculate, based on the measured reflectance values, voltage levels to be applied to the reflective color fluid application device.

In an example, the printing system comprises a media path 360, the media path 360 to move the print media from the printer to the spectrophotometer 320. In an example, the spectrophotometer 320 is placed directly following the printer along the media path 360. The media path may further guide the print media out of the printing system.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of calibrating optical density of a reflective color fluid to be deposited on a substrate, comprising:
   depositing keying color fluid on a first region of the substrate;
   applying a voltage level to a reflective color fluid application device;
   depositing, in response to the voltage level applied, reflective color fluid on the keying color fluid on the first region of the substrate and on the substrate at a second region of the substrate, the reflective color fluid having a higher reflectivity than the keying color fluid;
   measuring first and second optical densities of the first and second regions, respectively, using a spectrophotometer without polarizers;
   calculating, from the first and second optical densities, a calibration optical density value effectively measured using the spectrophotometer without polarizers that has a reverse correlation to an optical density measurable using a spectrophotometer with polarizers corresponding to the second optical density; and
   varying the voltage level applied to the reflective color fluid application device based on the calibration optical density value to calibrate the optical density of the reflective color fluid using the spectrophotometer without polarizers.

2. The method according to claim 1, wherein depositing the reflective color fluid comprises depositing a first quantity during a first deposition pass and a second quantity during a second deposition pass.

3. The method according to claim 1, wherein depositing the keying color fluid comprises applying a voltage level to a keying color fluid application device, a quantity of keying color fluid deposited corresponding to the applied voltage level.

4. The method according to claim 1, wherein varying the voltage level comprises monotonically increasing the voltage level in subsequent fluid depositions and performing reflectance measurements of the first region and of the second region deposited with increased quantities of reflective color fluid during each subsequent fluid deposition.

5. The method according to claim 1, wherein depositing the reflective color fluid comprises depositing a reflective metallic color fluid.

6. The method according to claim 5, wherein depositing the reflective metallic color fluid comprises depositing reflective silver color fluid.

7. The method according to claim 1, wherein depositing the keying color fluid comprises depositing a black color fluid.

8. The method according to claim 1, wherein calculating, from the first and second optical densities the calibration optical density value comprises:
calculating the calibration optical density value as a difference between the first and second optical densities.

9. A printing system comprising a printer, a spectrophotometer without polarizers and a controller, the controller comprising a processor, a data storage coupled to the processor and an instruction set to cooperate with the processor and the data storage to:
print first and second areas on a print media, the second printed areas comprising reflective color material, the first printed areas comprising the reflective color material on top of a keying color material;
receive from the spectrophotometer optical density measurement values of the first and second printed areas;
calculate a calibration optical density value effectively measured using the spectrophotometer without polarizers that has a reverse correlation to an optical density value measurable using a spectrophotometer with polarizers corresponding to the optical density measurement value of the second printed area, as a difference between the optical density measurement values of the first and second printed areas; and
vary the amount of the reflective color material based on the calibration optical density value to calibrate an optical density value of the reflective color material using the spectrophotometer without polarizers.

10. The printing system according to claim 9, comprising a reflective color fluid application device;
a keying color fluid application device;
a voltage controller coupled to the reflective color fluid application device and to the keying color fluid application device;
wherein the printing density is varied by instructing the voltage controller to vary the voltage level of the reflective color fluid application device.

11. The printing system according to claim 9, the reflective color fluid application device comprising a silver color ink application device.

12. The printing system according to claim 9, comprising a media path, the media path to move the printing media from the printer to the spectrophotometer and out of the printing system.

13. A non-transitory machine-readable storage medium encoded with instructions executable by a processor, the machine-readable storage medium comprising:
instructions to print an alternating pattern of reflective color lines on first and second areas of a print media, the first areas already printed with keying color lines, the reflective color lines having a reflectivity higher than a reflectivity of the keying color lines;
instructions to measure optical densities of the first areas and of the second areas using a spectrophotometer without polarizers;
instructions to calculate a calibration optical density value effectively measured using the spectrophotometer without polarizers that has a reverse correlation to an optical density measurable using a spectrophotometer with polarizers corresponding to the optical density of the second printed area, based on the optical densities of the first and second areas; and
instructions to vary color density of the reflective color lines as a function of the calibration optical density value.

14. The non-transitory machine-readable storage medium according to claim 13, comprising instructions to print silver color lines on the second areas and silver color-on-black color lines on the first areas.

15. The non-transitory machine-readable storage medium according to claim 14, comprising instructions to change a voltage controlling printing of the silver color lines when the calibration optical density value is above a threshold.

16. The non-transitory machine-readable storage medium according to claim 13, wherein the calibration optical density value is calculated as a difference between the optical densities of the first and second areas.

* * * * *